United States Patent [19]

Fog et al.

[11] 4,434,703
[45] Mar. 6, 1984

[54] GUN-MOUNT FOR A MACHINE GUN SUPPORTED BY A FORK OR FOR A WEAPON OF A SIMILAR KIND WITH MEANS FOR CONTINUOUSLY VARIABLE ADJUSTMENT OF THE ELEVATION OF THE UPPER SWIVEL ARM

[75] Inventors: Jørgen L. Fog, Skovlunde; Jørgen Nielsen, Farum, both of Denmark

[73] Assignee: Disa A/S (Dansk Industri Syndifat A/S), Herlev, Denmark

[21] Appl. No.: 270,331

[22] Filed: Jun. 4, 1981

[51] Int. Cl.³ .............................................. F41F 23/00
[52] U.S. Cl. ................................................ 89/37 B
[58] Field of Search .................. 89/1.802, 1.815, 37 B, 89/37 F, 37 R, 38, 39, 40 R, 40 B, 40 C, 37 A, 37.5 R, 41 R; 248/278, 281.1, 585, 586

[56] References Cited

U.S. PATENT DOCUMENTS

| | | | |
|---|---|---|---|
| 1,556,478 | 10/1925 | Benet | 89/37 A |
| 2,143,900 | 1/1939 | Rarey | 89/37 B |
| 2,690,896 | 10/1954 | Bissell et al. | 248/654 |

FOREIGN PATENT DOCUMENTS

| | | | |
|---|---|---|---|
| 300170 | 2/1915 | Fed. Rep. of Germany | 89/37.5 R |
| 862851 | 3/1941 | France | 89/37 A |
| 4734 | of 1905 | United Kingdom | 89/41 R |

Primary Examiner—Richard E. Schafer
Assistant Examiner—Maureen T. Ryan
Attorney, Agent, or Firm—Klarquist, Sparkman, Campbell, Leigh & Whinston

[57] ABSTRACT

A gun mount e.g. for a machine gun supported by a fork comprises two mutually hinged swivel arms (2 and 3) in staggered position the one at a higher level than the other and designed to rotate around vertical axes (30, 31). The lower swivel arm (2) has a vertical pivot journal at its free end to be mounted in a pivot bearing (1). The upper swivel arm (3) is formed as a parallelogram connection for vertical adjustment of the fork (22) designed to support the weapon at the free end of the parallelogram connection.

The forced vertical adjustment of the parallelogram connection is provided by means of at least one rod mechanism (15, 16, 17), which is mounted between two of the parallelogram sides and has a length adjustable in a controllable way.

3 Claims, 1 Drawing Figure

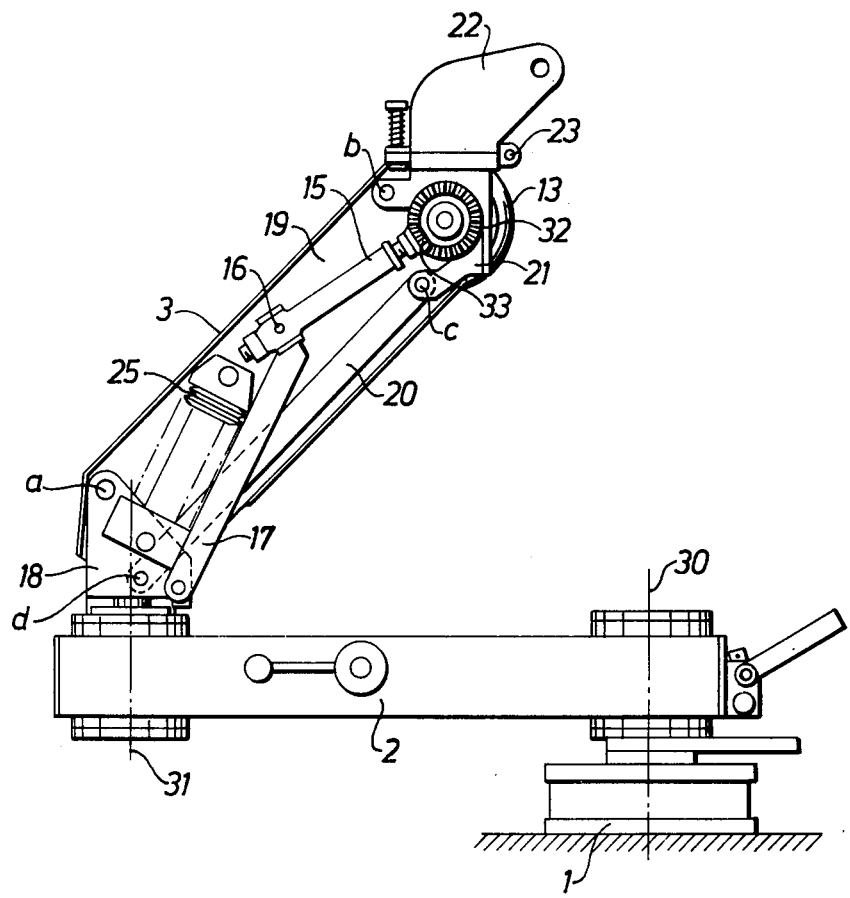

said hand wheel being used when operating the rod mechanism.

We claim:

1. Gun mounting apparatus, comprising:
a pair of swivel arms including an upper arm and a lower arm pivotally connected together at one end thereof for rotation of the upper arm about an axis, said upper swivel arm being in the form of a parallelogram including an upper long side in the shape of a hollow box which surrounds the lower long side and the upper and lower short sides of said parallelogram;
a gun mount attached to the free end of said upper arm; and
height adjustment means for adjusting the height of said free end of said upper arm, including a connecting rod means of variable length connected between two sides of the parallelogram and geared control means for changing the length of said connecting rod means.

2. Apparatus in accordance with claim 1 in which the connecting rod means is connected between an upper long side and a lower short side of the parallelogram and includes threaded spindle means of adjustable length attached to a compression bar of fixed length.

3. Apparatus in accordance with claim 1 in which the control means includes a crown gear which is connected to a pinion gear attached to one end of the connecting rod means for changing the length of said connecting rod means in response to rotation of said crown gear means about a horizontal axis.

* * * * *

GUN-MOUNT FOR A MACHINE GUN SUPPORTED BY A FORK OR FOR A WEAPON OF A SIMILAR KIND WITH MEANS FOR CONTINUOUSLY VARIABLE ADJUSTMENT OF THE ELEVATION OF THE UPPER SWIVEL ARM

This invention relates to a gun-mount for machine guns supported by a fork or for weapons of a similar kind, which mount comprises two mutually hinged swivel arms rotatable around vertical axes and in staggered position the one at a higher level than the other, the lower of said arms at its free end having a vertical pivot journal to be placed in a pivot bearing, which may be mounted e.g. at a motor vehicle at the edge of a gun pit cut out in the roof of the driver's cab, while the upper arm, which is formed as a parallelogram connection is provided with fittings at its free end for pivotal fastening of a fork designed for mounting of the weapon.

From Danish Patent specification No. 133,484 a gun-mount of this kind is known, where the parallelogram connection is balanced by means of an appropriately mounted compression spring between a short and a long parallelogram side. Moreover, in the known gun-mount a releasable locking device has been provided, which can be released when shooting, and which can be used for locking the parallelogram connection in various deformation positions, either when the gunner has to keep the weapon ready in some elevated position or he has to load or unload the weapon. The locking device is formed as a lock mechanism known per se for blocking and unblocking the hinged connection between the upper short parallelogram side and the lower long parallelogram side.

The purpose of the invention is to provide a gun-mount, where the parallelogram connection of the upper swivel arm can be vertically adjusted in a continuously variable way and by means of only one handling. According to the invention, this purpose is achieved using a gun-mount of the type mentioned in the introduction, and characterized in that in order to provide the forced vertical adjustment of the parallelogram connection one or several rod mechanisms have been mounted having a length adjustable in a controllable way between two of the sides of the parallelogram connection.

The rod with the adjustable length allows a simple operation, as the rod may be formed e.g. as a telescope rod being locked in an arbitrary horizontal adjustment. Thus, possibly precious time shall no longer be devoted to operate a lock mechanism, where a pawl or the like must intermesh with a toothed rim, and at the same time a release from the graduated adjustment is obtained.

In a preferred embodiment of a gun-mount according to the invention a rod mechanism having a length adjustable in a controllable way is placed between the lower short side and the upper long side of the parallelogram connection and is rotatably connected with the two parallelogram sides. By this, a certain adjustment of the rod in horizontal direction will give rise to a larger adjustment in vertical direction of the upper point of the parallelogram connection.

According to the invention the rod mechanism may comprise a compression bar rotatably fastened to the lower short parallelogram side, and a threaded spindle designed to intermesh with a threaded hole at the free end of the compression bar, said spindle being embedded in and connected with the upper long parallelogram side through a crown-bevel pinion wheel connection, where the crown wheel is pivotally embedded in the upper parallelogram side, while the bevel pinion wheel is mounted at the free end of the threaded spindle. When the crown wheel is turned, a simultaneous turning of the bevel pinion wheel will cause the spindle to lead the compression bar towards or away from the crown wheel during folding respectively unfolding of the parallelogram connection. By this, a precise steering is achieved by means of components known per se, and by a suitable dimensioning of the crown-bevel pinion wheel connection a relatively large angular motion of the bevel pinion wheel can be achieved through a relatively small angular motion of the crown wheel, and thus a relatively large adjustment of the rod mechanism in horizontal direction can be obtained.

According to the invention, the crown wheel may be fastened to an axle pivotally embedded in the upper, long parallelogram side, the free ends of said axle extending horizontally from the parallelogram connection and being provided with hand wheels to be used when turning the crown wheel. This embodiment allows a very simple operation of the rod mechanism, as at least one of the hand wheels will be accessible to the gunner, irrespective of which position the parallelogram connection has in relation to the lower swivel arm and the gun pit.

In the following, the invention will be further explained with reference to the drawing, which shows a gun-mount designed according to the invention, where for the sake of clearness certain parts are cut away at the parallelogram connection.

The gun-mount shown in the drawing comprises an upper and a lower swivel arm, 3 and 2 respectively, that are mutually pivotally connected around a vertical axis 31 and 30 in staggered position the one at a higher level than the other. At its end facing away from the hinged connection with the upper swivel arm 3, the lower swivel arm 2 is pivotally embedded in a pivot bearing 1 around a vertical axis 30.

The parallelogram connection comprises a lower short parallelogram side in the form of a bearing bracket 18, an upper short parallelogram side 21 in the form of fittings to receive a fork 22 for mounting the weapon, a lower long parallelogram side 20 in the form of an articulated rod as well as an upper parallelogram side 19 in the form of a plate bent to box-shape. The parallelogram sides mentioned are mutually pivotally connected in the bearing points a, b, c, and d. For balancing the parallelogram connection a disc spring 25 known per se has been inserted between the upper long parallelogram side 19 and the lower short parallelogram side 18.

In order to provide the vertical adjustment of the parallelogram connection, a rod connection has been used which comprises a compression bar 17 being revolvingly fastened to the lower parallelogram side 18, and a threaded spindle 15 which at its one end intermeshes with a nut 16 fastened to the compression bar 17, and at its other end has a bevel pinion wheel 33 intermeshing with a crown wheel 32 pivotally suspended in the upper long parallelogram side 19. The crown wheel 32 is designed to revolve at the level of the parallelogram connection and is fastened to an axle extending vertically from the parallelogram connection at both sides of said connection. To the axle 32 of the crown wheel a hand wheel 13 has been fastened at the ends,